United States Patent [19]

Kozlowski

[11] Patent Number: 5,335,752
[45] Date of Patent: Aug. 9, 1994

[54] AUTOMATIC RETURN LADDER FOR USE ON LAND CONVEYORS

[76] Inventor: Frank Kozlowski, 1766 Yardville-Hamilton Square Rd., Trenton, N.J. 08650

[21] Appl. No.: 982,867

[22] Filed: Nov. 30, 1992

[51] Int. Cl.⁵ .............................................. E06C 5/00
[52] U.S. Cl. ...................... 182/127; 182/97; 280/166
[58] Field of Search ............ 182/127, 97, 90, 91, 182/92; 280/163, 166

[56] References Cited

U.S. PATENT DOCUMENTS

| | | | |
|---|---|---|---|
| T977,005 | 12/1978 | Sidles, Jr. et al. | 280/163 |
| 2,164,327 | 7/1939 | Hawkins . | |
| 3,033,309 | 5/1962 | Fugere | 182/90 |
| 3,603,429 | 9/1971 | Shepherd | 182/91 |
| 3,882,965 | 5/1975 | Loomis et al. . | |
| 3,887,216 | 6/1975 | Perry | 280/163 |
| 3,967,695 | 7/1976 | Waddell | 280/166 X |
| 3,976,164 | 8/1976 | Miller | 182/90 X |
| 4,054,298 | 10/1977 | Urbaitis | 280/163 |
| 4,121,495 | 10/1978 | Malo et al. . | |
| 4,161,997 | 7/1979 | Norman . | |
| 4,245,716 | 1/1981 | Rayfield | 182/127 X |
| 4,564,205 | 1/1986 | Shookman et al. | 182/90 X |
| 4,753,447 | 6/1988 | Hall . | |
| 5,024,292 | 6/1991 | Gilbreath et al. | 182/127 X |
| 5,064,023 | 11/1991 | Loeber | 182/127 X |
| 5,163,531 | 11/1992 | Whiting | 182/97 X |

FOREIGN PATENT DOCUMENTS 2073807  10/1981  United Kingdom ................ 182/127

*Primary Examiner*—Karen J. Chotkowski
*Attorney, Agent, or Firm*—Mathews, Woodbridge & Collins

[57] ABSTRACT

This invention relates to a ladder which automatically returns to an original position after impact with grade or objects. Preferably the ladder is attached to a land conveyance. A spring assembly connects the ladder to a land conveyance to provide movement in a forward, rearward or lateral direction from the original position of the ladder.

14 Claims, 2 Drawing Sheets

AUTOMATIC RETURN LADDER FOR USE ON LAND CONVEYORS

BACKGROUND OF THE INVENTION

1. Field of Invention

This invention relates to a ladder for use on land conveyances which automatically returns to an original position after impact with grade or objects.

2. Description of the Related Art

A ladder is frequently used on a land conveyance, such as a dump truck, to allow access to the payload area from the ground. The ladder is removed or retracted above the truck during movement of the vehicle. Typically the ladder is removed by hand or by applied pressure to a mechanical device. Conventional ladders have the disadvantage that the structure can become bent if the ladder is not removed during moment of the vehicle or if another vehicle contacts the ladder during use. Also, the release mechanism can malfunction resulting in inoperability of the ladder. Without a ladder, the operator has either an unsafe access to the payload area or no access at all. The operator can either ascent or descend the vehicle on a bent or out of position ladder or on the vehicle itself or simply leap off the vehicle. The above alternatives often result in accidents to the operator. The problem of providing a permanent ladder for a land conveyance which is able to withstand considerable impact has persisted since the initial use of ladders on land conveyances.

A typical self-storing ladder for a vehicle is described in U.S. Pat. No. 4,161,997. In this assembly, a step section is pivotally mounted to a vehicle. Pivoted pins are aligned in bores to effect the desired pivotal connections. The step section is manually pivoted about a horizontal axis between an operative position and a storage position. When the ladder is in use, the ladder is anchored to the ground with a foot plate attached with wing bolts. The ladder is moved into the storage position by loosening the wing bolts and pivotally rotating the ladder.

U.S. Pat. No. 5,024,292 to Gilbreath et al. describes a ladder mountable to a column in order to swing laterally about the column and to be tilted in vertical planes. A spring is arranged to bias the ladder after being moved to a predetermined position.

U.S. Pat. No. 5,064,023 to Loeber describes a flexible ladder for use on a moving vehicle which provides frontal stability but lateral flexibility. A first set of steps are fixedly attached to the vehicle. A second set of steps are attached to the vehicle below the first set of steps. Three rubber struts are used to mount the second set of steps to the vehicle. Metal straps are attached to the rubber struts to increase the frontal stiffness of the ladder.

Of possible general relevance to the invention are U.S. Pat. Nos.: 2,164,327, 3,882,965, 4,121,495, and 4,753,447 which describe assemblies for portable ladders.

A practical solution for an automatically returning ladder assembly is not found in the prior art.

SUMMARY OF THE INVENTION

Briefly described, the invention comprises resilient means for mounting a ladder to a land conveyance. The ladder can be displaced during movement of the land conveyance upon contact with an object. After contact, the ladder returns to its original position. The ladder has the advantage of being able to withstand considerable impact and still return to an original position to remain usable by an operator.

In accordance with the teachings of the present invention, a spring assembly is preferably used to connect the ladder to the land conveyance. An eyebolt is threadedly connected to the spring for adjusting tension of the spring. Preferably, a hex-bolt locks the eyebolt in place at the desired tension. A spring retainer link attaches the spring assembly to a mounting plate. The mounting plate and spring assembly preferably can be attached to the truck bumper near the payload area or near the cab. In the alternative, the spring assembly can be attached to a hydraulic lift gate.

DETAILED DESCRIPTION OF THE INVENTION

During the course of this description like numbers will be used to identify like elements according to the different figures which illustrate the invention.

Figure 1:
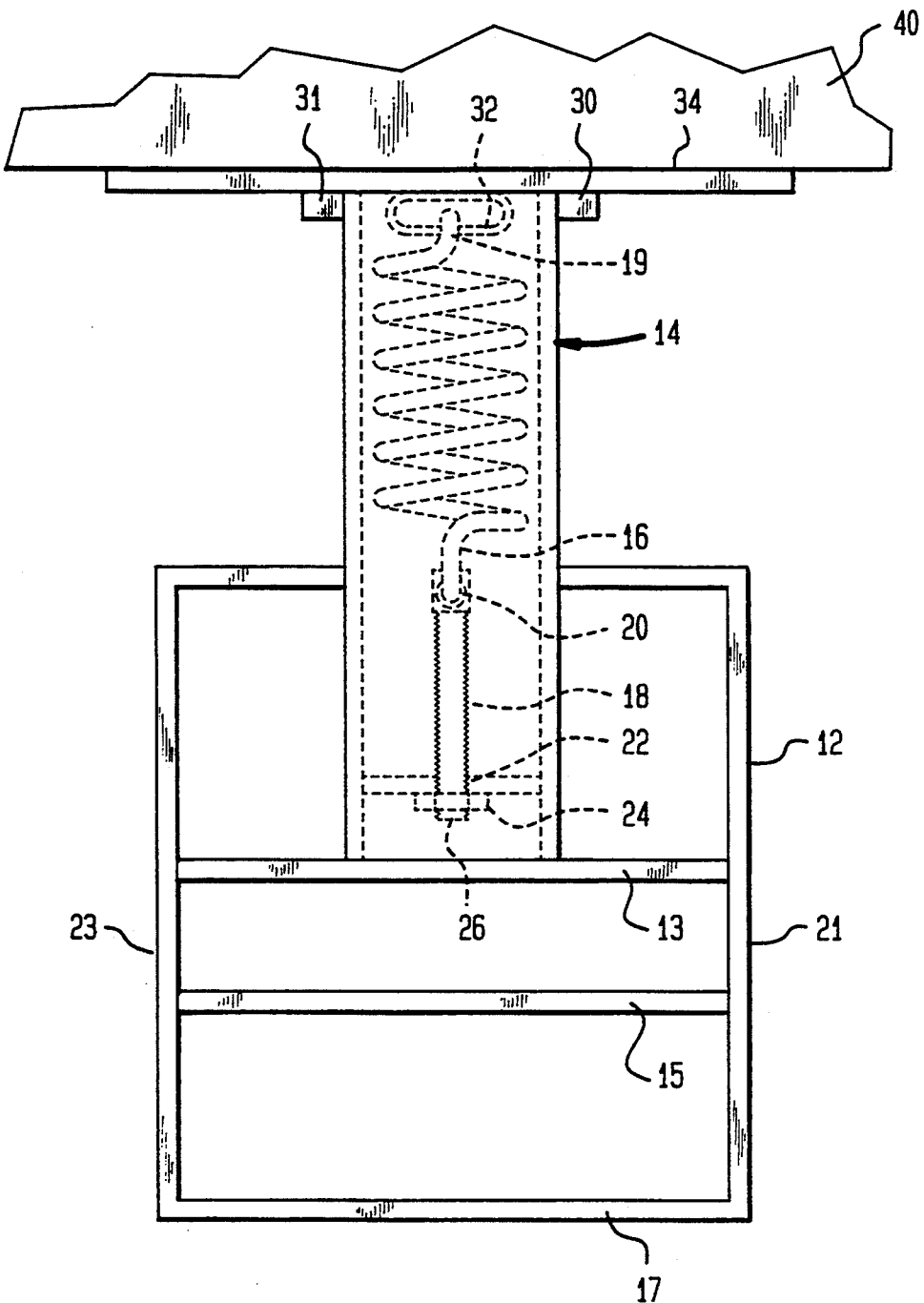
FIG. 1 is a front elevational view of the automatic return ladder of the present invention.

FIG. 1 is a front elevational view of the ladder assembly 10 in accordance with the principals of the present invention. Ladder assembly 10 includes a ladder section 12 extending in a vertical direction. Ladder section 12 is formed of ladder rungs 13, 15 and 17 transversely mounted to side sections 21 and 23. Rungs 13, 15 and 17 preferably include safety tread on an upper surface thereof. Preferably ladder section 12 is formed of steel. In the alternative, ladder section 12 can be formed of aluminum or plastic.

Figure 2:
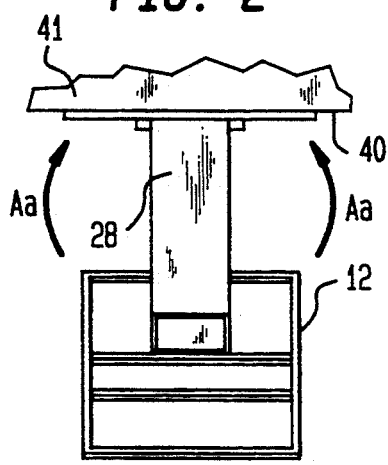
FIG. 2 is a front elevational view of the automatic return ladder attached to the rear of a land conveyance after impact with grade or objects.

A spring assembly 14 is positioned between ladder section 12 and land conveyance 40. Spring assembly 14 allows ladder section 12 to rotate in either a forward or background direction from the vertical position of the ladder, as shown in FIG. 2.

Figure 3:
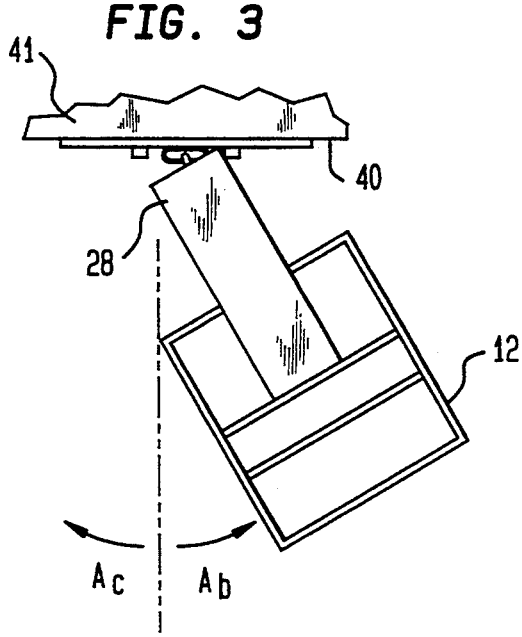
FIG. 3 is a front elevational view of the automatic return ladder attached to the side of a land conveyance after impact with grade or objects.

Spring 29 of spring assembly 14 expand upon impact of ladder section 14 with the grade or an object spring 23 returns to its original position after pressure with the object is relieved. Ladder section 12 moves along angle $A_b$ and $A_c$ up to a 90° angle from vertical. In the alternative, if the ladder section is attached to the side 41 of land conveyance 40 ladder section moves laterally along angle $A_b$ and $A_c$ up to a 90° angle from vertical, as shown in FIG. 3.

Figure 4:
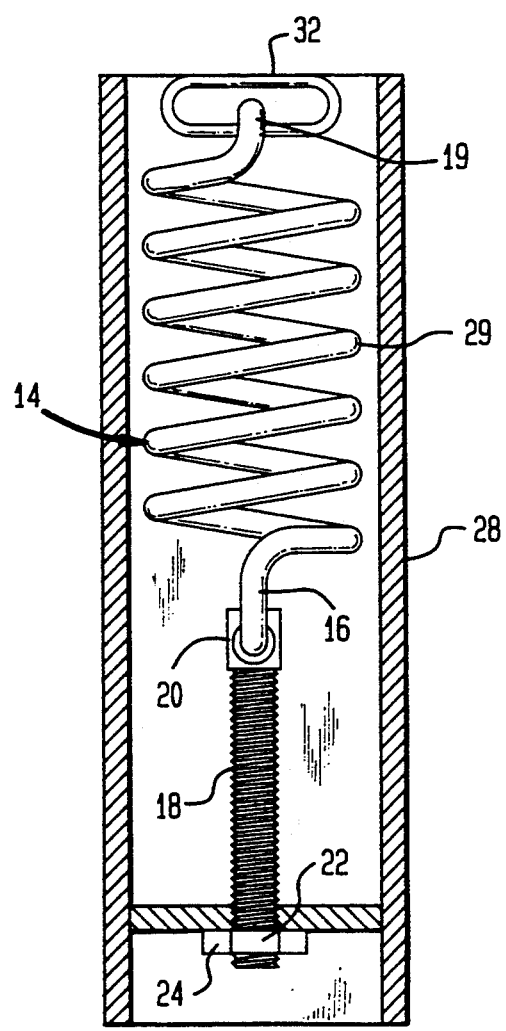
FIG. 4 is a cross-sectional view of the spring assembly shown in FIG. 1.

FIG. 4 is a cross-sectional view of spring assembly 14. Eyebolt 18 includes a threaded body portion for threaded engagement to end 16 of spring 29. Bolt 24 is preferably attached to end 22 of eyebolt 18. Eyebolt 18 can be tightened by turning bolt 24 to increase tension on spring 29. After tightening bolt 24, hex bolt 24 locks eyebolt 18 in place. Preferably bolt 24 is a hex bolt. The tension on spring 29 is adjusted for the weight of an operator so that spring assembly 14 remains in a vertical position during use. Preferably spring 29 is adjusted for 225 lbs. Spring retainer link 32 attaches end 19 of spring 29 to mounting plate 34. Preferably spring retainer link 34 is welded to mounting plate 34.

An upper surface of mounting plate 34 is attached to land conveyance 40. Mounting plate 34 can be attached to the body of a land conveyance, such as a dump truck. Mounting plate 34 can be attached to the rear bumper of the truck for accessing the payload area or to the cab or side of the truck for allowing access to the cab. In the alternative, mounting plate 34 can be attached to a hydraulic lift gate. It will be appreciated that uses of the spring assembly by attaching the mounting plate to various surfaces can be understood by the teachings of the present invention.

A lower surface of mounting plate 34 is attached to spring retainer link 32. Preferably mounting plate 34 can be attached to land conveyance 40 by bolting mounting plate 34 to the land conveyance. In the alternative, mounting plate 34 can be welded to land conveyance 40.

Housing 28 surrounds spring assembly 14 and eyebolt 18. A pair of blocks 30 and 31 are positioned on either side of housing 28. Blocks 30 and 31 guide housing 28 upon movement of spring assembly 14 in a forward or rearward direction. Blocks 30 and 31 allow guide housing 28 to return to a vertical position after impact with the object.

The present invention has the advantage of automatically returning a ladder to a use position after contact of the ladder with an object or grade. A spring mechanism provides for rotation of the ladder in a forward, backward or lateral direction from the land conveyance. The ladder assembly provides for increased safety of operators of land conveyances.

While the invention has been described with reference to the preferred embodiment thereof, it will be appreciated by those of ordinary skill in the art that modifications can be made to the structure and form of the invention without departing from the spirit and scope thereof.

I claim:

1. A ladder for use on a land conveyance, said ladder comprising:

a ladder section having a pair of side members and a plurality of step members being vertically spaced apart from each other and secured to said side members; and means for resiliently mounting said ladder section to said land conveyance including a spring having a first end connected to said land conveyance and a second end connected to said ladder section, said spring rotating said ladder section in a forward and backward direction from the vertical position of said ladder section, wherein said ladder section is displaced during movement of said land conveyance upon contact with an object and said spring automatically returns said ladder to its original position after contact of said object.

2. The ladder according to claim 1 wherein said ladder moves along an angle of up to 90° from vertical.

3. A ladder for use on a land conveyance, said ladder comprising:

a ladder section having a pair of side members and a plurality of step members being vertically spaced apart from each other and secured to said side members; and means for resiliently mounting said ladder section to said land conveyance, said means for resiliently mounting said ladder section including a spring having a first end connected to said land conveyance and a second end connected to said ladder section, an eyebolt for controlling the tension of said spring threadly connected between said second end of said spring and said ladder section, wherein said ladder section is displaced during movement of said land conveyance along an angle of up to 90° from vertical upon contact with an object and returns to its original position after contact of said object.

4. The ladder according to claim 3 further comprising a locking means for locking said eye bolt at a predetermined tension of said spring.

5. The ladder according to claim 4 further comprising a spring retainer link for attaching said spring to said land conveyance.

6. The ladder according to claims 5 wherein said ladder further comprises a mounting plate, said mounting plate having a first surface mounted to said land conveyance and a second surface mounted to said spring retainer link.

7. The ladder according to claim 6 further comprising a spring housing, said spring housing being attached to said ladder section and surrounding said spring.

8. The ladder according to claim 7 further comprising guide means, said guide means including a pair of blocks wherein said housing is positioned between said pair of blocks.

9. The ladder according to claim 8 wherein said spring retainer link is welded to said mounting plate.

10. The ladder according to claim 9 wherein said mounting plate is welded to said land conveyance.

11. The ladder according to claim 9 wherein said mounting plate is bolted to said land conveyance.

12. The ladder according to claim 9 wherein said mounting plate is attached to the rear of said land conveyance adjacent a payload area.

13. The ladder according to claim 9 wherein said mounting plate is attached to the cab of said land conveyance.

14. The ladder according to claim 9 wherein said mounting plate is attached to a hydraulic lift gate.

* * * * *